United States Patent [19]

Ide et al.

[11] Patent Number: 4,812,813

[45] Date of Patent: Mar. 14, 1989

[54] DISPLAY RADIO PAGER HAVING GRAPHIC ALARM FOR SELECTIVE INDICATION OF MEMORY AVAILABILITY FACTORS

[75] Inventors: Motoki Ide; Toshifumi Sato, both of Tokyo, Japan

[73] Assignee: NEC Corporation, Tokyo, Japan

[21] Appl. No.: 89,110

[22] Filed: Aug. 25, 1987

[30] Foreign Application Priority Data

Aug. 25, 1986 [JP] Japan ................................ 61-198708

[51] Int. Cl.[4] ........................... H04Q 1/30; G08B 5/22

[52] U.S. Cl. .............................. 340/311.1; 340/825.44

[58] Field of Search ........... 340/311.1, 825.44, 825.47, 340/825.48, 825.5, 825.51

[56] References Cited

U.S. PATENT DOCUMENTS 4,626,842 12/1986 Ichikawa et al. .............. 340/825.44

FOREIGN PATENT DOCUMENTS 0110506 5/1984 European Pat. Off. ......... 340/311.1

*Primary Examiner*—Donnie L. Crosland

*Attorney, Agent, or Firm*—Sughrue, Mion, Zinn, Macpeak & Seas

[57] ABSTRACT

A selective calling display radio pager has a memory which is configured to store a plurality of received messages for later retrieval so that the amount of messages which can be stored is limited by one of first and second memory availability factors depending on the length of each of the received messages. A controller determines one of the first and second memory availability factors which is more accurate early warning against possible depletion of the memory than the other and displays it on a graphic alarm indicator along with a display of a message retrieved from the memory. Specifically, the controller determines the ratio of a sum of messages which can be received at a given time to the maximum number of messages which can be stored and the ratio of a sum of message segments which can be received at said given time to the maximum number of such message segments which can be stored, and provides a display of the smaller ratio on the graphic alarm indicator.

5 Claims, 3 Drawing Sheets

DISPLAY RADIO PAGER HAVING GRAPHIC ALARM FOR SELECTIVE INDICATION OF MEMORY AVAILABILITY FACTORS

BACKGROUND OF THE INVENTION

The present invention relates to a selective calling display radio pager having a memory for storing a plurality of succesively received messages for later retrieval.

Recent advances in microelectronics have made possible the introduction of a large capacity memory into a compact radio pager at modest prices, allowing a great amount of information to be transmitted to the pager on a single call. Multiple messages can therefore be received in sequence and stored into different locations of a memory which can be respectively addressable. Since the amount of information that can be stored is finite, provisions must be made to give early warning to the paging user against the possible depletion of memory storage. A known prior art display pager includes an indicator which provides a display of the number of message entries already stored in memory. Another prior art pager provides a display of the number of characters already stored in memory.

However, the memory is configured so that its capacity is limited both by the amount of message entries and the amount of message segments or characters and these limiting factors vary with the number and length of each of the messages received. It is therefore desirable to selectively indicate one of the limiting factors which is more accurate than the other as an early warning indication.

SUMMARY OF THE INVENTION

It is therefore an object of the present invention to provide a selective calling display radio pager capable of selectively giving accurate early warning indication of memory availability factors.

According to a broader aspect of the present invention, a selective calling display radio pager is adapted to receive a paging signal including a selective calling address and a message and includes an address detector for detecting a calling address identifying the radio pager. A memory stores each of a plurality of messages in response to the detection of a calling address. The memory is configured so that the amount of messages which can be stored is limited by one of first and second memory availability factors depending on the length of each of the messages stored in the memory. The stored messages are later retrieved for display on a screen. One of the first and second memory availability factors which is more accurate early warning against possible depletion of the memory than the other is determined and displayed on a graphic alarm indicator.

According to a specific aspect of the invention, the pager comprises a memory which is divided into sectors and directory cells, each of the messages being stored in one or more of the sectors, the directory cells respectively indicating entries of the stored messages and having a maximum number smaller than the maximum number of the sectors. A controller determines the ratio of a sum of the directory cells which are empty to the maximum number of the directory cells and the ratio of a sum of the sectors which are empty to the maximum number of the sectors, and provides a display of the smaller ratio on the graphic alarm indicator.

BRIEF DESCRIPTION OF THE DRAWINGS

The present invention will be described in further detail with reference to the accompanying drawings, in which.

DETAILED DESCRIPTION

Figure 1:
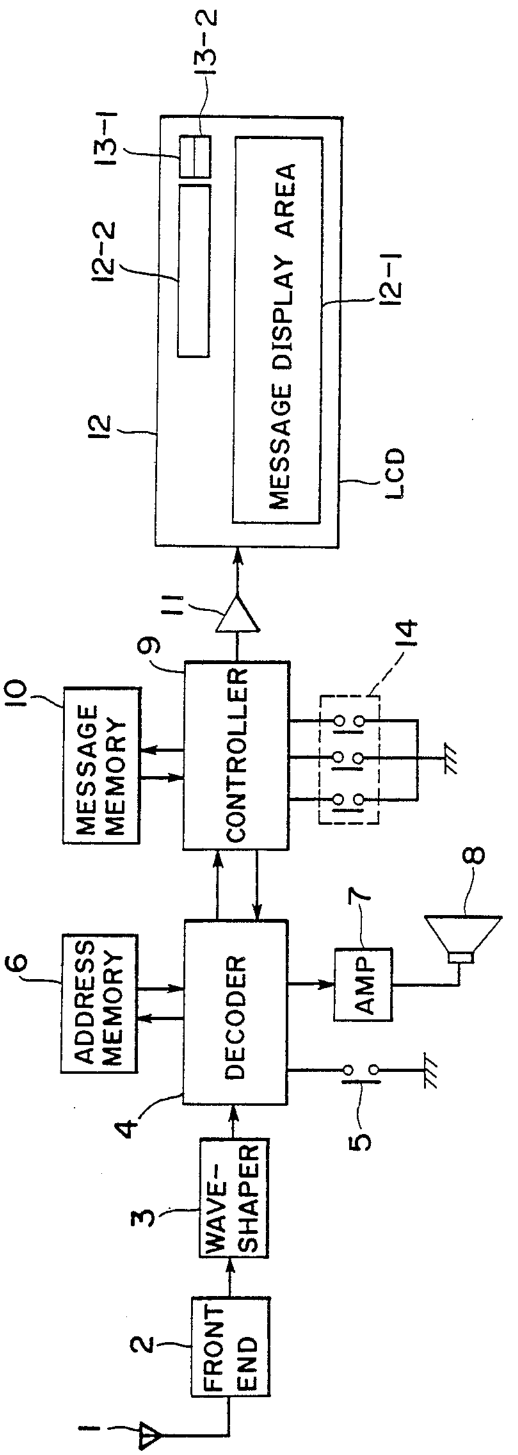
FIG. 1 is a block diagram of a selective calling display radio pager of the present invention.

A selective calling display radio pager of the invention, as schematically illustrated in FIG. 1, includes a microprocessor-based controller 9 for processing radio-frequency paging signals transmitted from a central station of the radio paging network and detected by an antenna 1. The paging signal is a modulated carrier of digital signal having a predetermined data format starting with a preamble followed by a series of data blocks each comprising a pager identifying address and a message to be displayed on that pager. Front end 2 amplifies and demodulates the received signal for coupling to waveshaper 3.

As will be described, the message comprises a varying number of characters up to a maximum of 512 which is represented by $32\times16$ bytes. To permit the pager to store a series of successively arrived messages, a message memory 10 is provided for later retrieval. Memory 10 has a storage capacity which is limited both in terms of a maximum number of message segments (each being 32 bytes) and in terms of a maximum number of messages. Typically, the maximum number of message segments is 56 and the maximum number of messages is 40.

As in the conventional diplay pager, the digital paging signal from waveshaper 3 is supplied to a decoder 4 where the pager identifying addresses contained in a series of data are compared with a unique address of the user stored in a programmable read-only memory 6 to detect a match. On detecting a match, the decoder 4 supplies a signal that follows to the controller 9 to permit it to check for the presence of a valid message. Controller 9 returns a signal to the decoder 4 if a valid message is contained in the received paging signal to cause the decoder to apply a tone signal through amplifier 7 to loudspeaker 8 to alert the user. Reset switch 5 is operated by the user to turn off the alarm. Message control keys 14 are connected to the controller 9 to allow the user to access the desired portion of the memory 10 and display it through driver 11 on a liquid crystal display 12.

Figure 2:
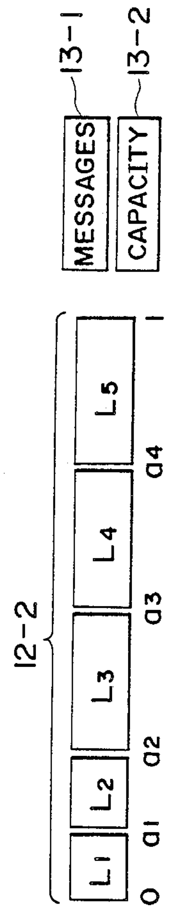
FIG. 2 is an illustration of the graphic alarm indicator of FIG. 1 for indicating a memory availability factor and identifying indicators.

Display 12 includes a message display area 12-1 and a memory availability indicator 12-2. As shown in FIG. 2, indicator 12-2 is divided into a series of rectangular smaller segments L1 and L2 and rectangular larger segments L3 to L5. As will be described, the indicator segments are illuminated to graphically illustrate the ratio (X) of a sum of new messages which can be received to the maximum number of messages which can be stored in the memory or the ratio (Y) of a storage capacity available for receiving new message segments to the maximum capacity of the memory for storing such message segments to the fullest extent, depending on which one of the ratios is smaller than the other. Content indicators 13-1 and 13-2 are provided to respectively indicate which one of the ratios is indicated. When the ratio X is indicated, "messages" indicator 13-1 is illuminated and when the ratio Y is indicated, "capacity" indicator 13-2 is illuminated. The ratio X is smaller than ratio Y if the memory 10 is filled with a greater number of relatively short messages and the ratio Y is smaller than ratio X if it is filled with a smaller number of relatively long messages. In either case, the lesser ratio provides a valid indication of the amount of available information that can be stored.

Figure 3:
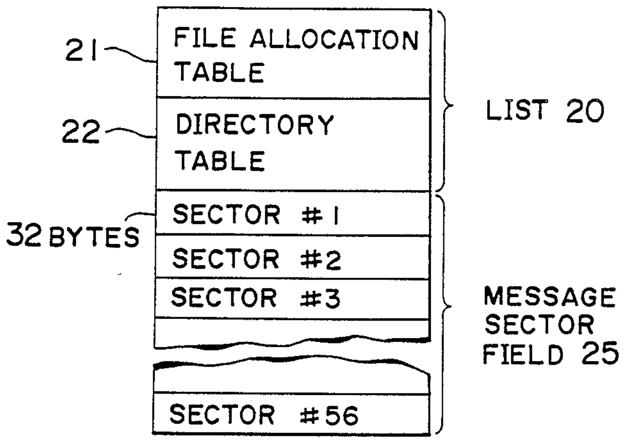
FIG. 3 is an illustration of the detail of the message memory of FIG. 1.
Figure 4:
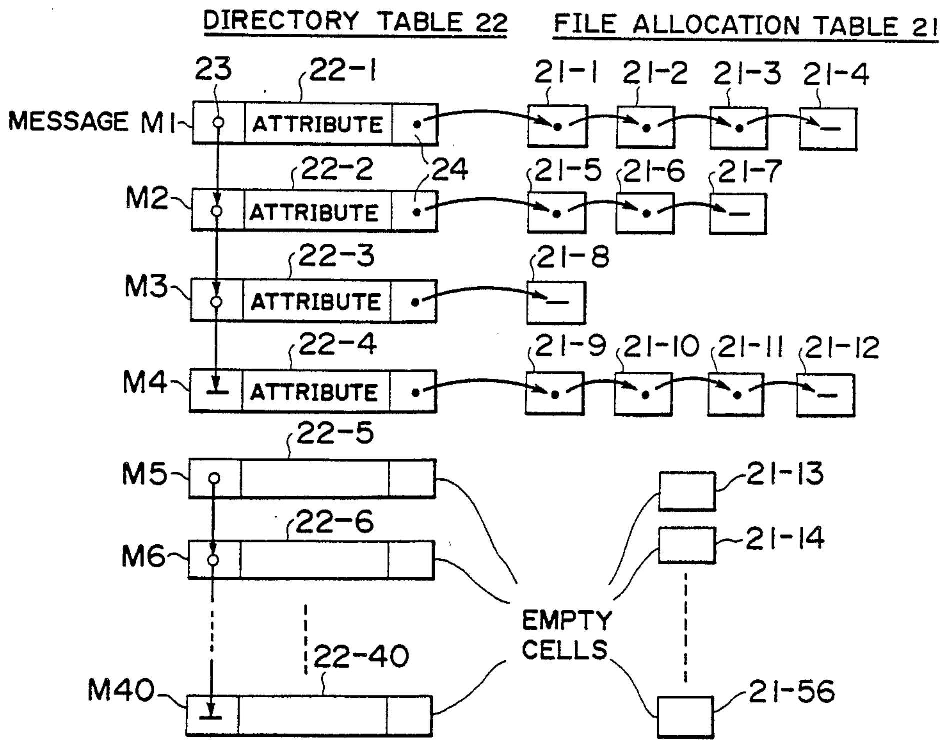
FIG. 4 is an illustration of details of the file allocation table and directory table of FIG. 3.

In FIG. 3, the message memory 10 is divided into a list 20 and a message sector field 25 comprising a plurality of sectors. List 20 comprises a file allocation table 21 and a directory table 22. The sectors are each 32 bytes of memory and designated #1 through #56, with a total of 1792 bytes or characters. Sixteen of these sectors are grouped to form a message of maximum length. As shown in FIG. 4, the file allocation table 21 comprises file pointer cells 21-1 through 21-56 corresponding respectively to sectors #1 through #56 and the directory table 22 comprises directory cells 22-1 through 22-40 corresponding respectively to different messages M1 through M40. A maximum of 40 variable length messages are uniquely identified by directory cells 22-1 through 22-40.

Each of the directory cells 22-j (where j=1, 2 . . . 40) includes an order pointer 23, as marked by a blank dot, to store an address for identifying the directory cell 22-(j+1), an attribute or entry of the corresponding message and a file pointer 24 marked by a solid dot to store an address for identifying the first of a series of file pointer cell 21-i (where i=1, 2 . . . 56) which correspond to the sectors in which the corresponding message is stored. If a first arrived message M1 has 128 bytes and so it is stored into sectors #1 through #4, an address is written into the order pointer 23 of directory cell 22-1 which identifies the directory cell 22-2 of the next message M2 and an address is written into the file pointer 24 of the directory cell 22-1 which identifies the first of four file pointer cells 21-1 through 21-4 which respectively correspond to sectors #1 through #4. File pointer cells 21-1, 21-2 and 21-3 are written with addresses which respectively identify file pointer cells 21-2, 21-3 and 21-4, and the last cell 21-4 is written with an end-of-message signal marked by a symbol "—". Likewise, successive messages M2, M3 and M4 of 3-, 1- and 4-sector lengths are stored into the memory 10 occupying the sectors #5 through #12 which correspond to file pointer cells 21-5 through 21-12, resepctively. The order pointer of directory cell 22-2 points to the address of directory cell 22-3, and the order pointer of cell 22-3 points to the address of cell 22-4. The order pointer of cell 22-4 which corresponds to the last of a series of messages M1 through M4 is written with an end-of-series signal. The order pointers 24 of empty directory cells 22-5 through 22-39 contain addresses pointing to the addresses of the respectively next adjacent directory cells, with the order pointer of the last directory cell 22-40 being written with an end-of-series signal.

Figure 5:
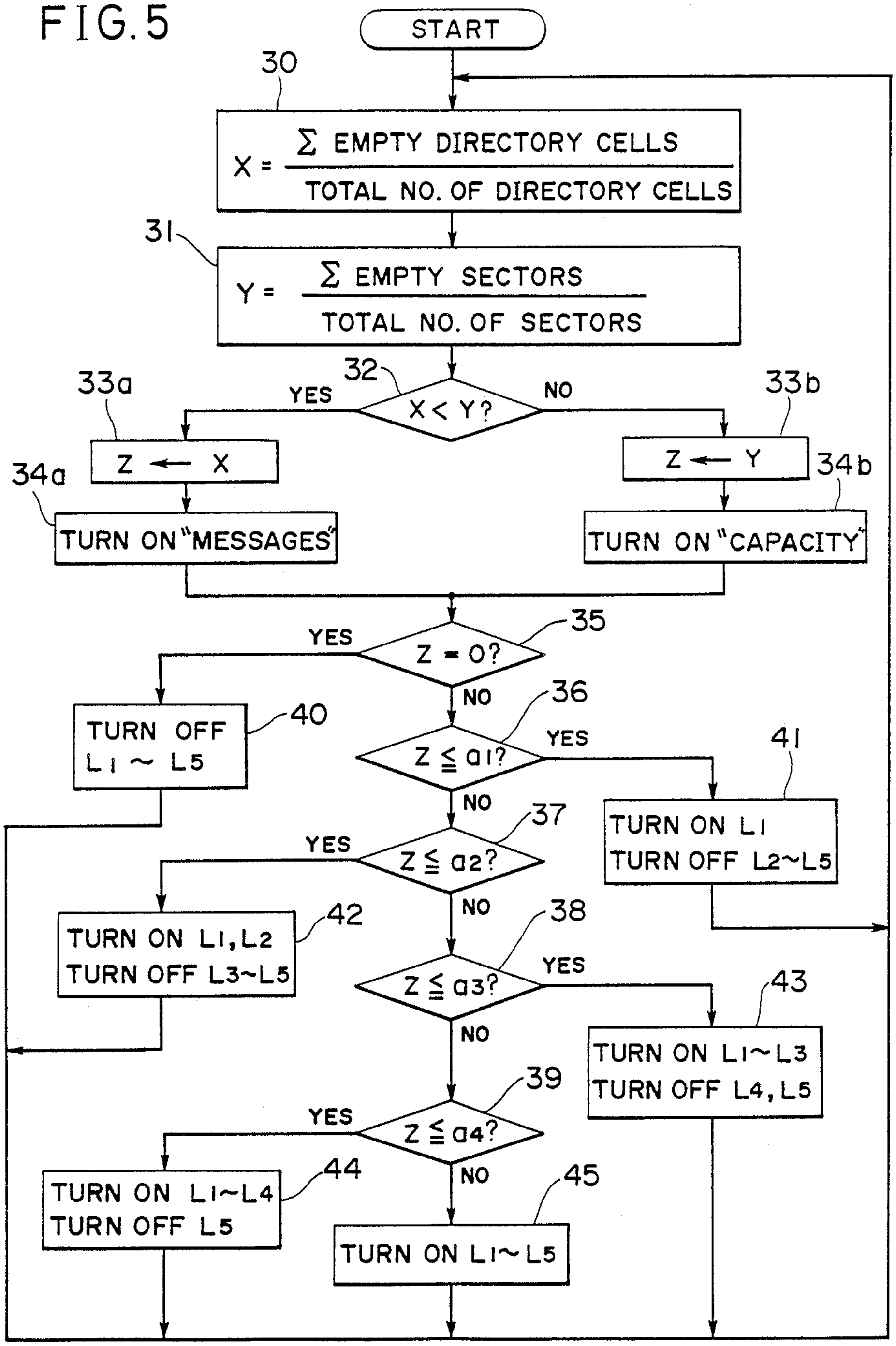
FIG. 5 is a flowchart describing the operation of the controller of FIG. 1.

Microprocessor-based controller 9 is programmed to perform control on the memory availability indicator 12-2 of the display 12 in accordance with an algorithm shown in FIG. 5 using the message segments stored in the sector field 25 and directory table 22 of message memory 10. The program execution starts in response to the reception of a message or in response to the operation of one of the recall keys 14 to provide a display of a memory availability factor on the graphic indicators 12-2, 13-1 and 13-2 along with a display of the received or stored message. The program starts with the execution of operations block 30 which directs the computing of a ratio X of the number of empty directory cells 22-j, or receivable messages, to the total number of messages, i.e., "40". Exit then is to operations block 31 which directs the computing of a ratio Y of the number of empty sectors (or file pointer cells 21-i), or available capacity, to the total number of sectors, i.e., "56". Control proceeds to decision block 32 which checks to see if the ratio X is smaller than ratio Y. If it is, exit is to operations block 33*a* which directs the writing of the ratio X into a register Z and finds exit to operations block 34*a* which turns on the unit indicator 13-1 to brighten the indicator "MESSAGES". If the answer is negative in block 32, exit is to operations block 33*b* which directs the writing of the ratio Y into the register Z and finds exit to operations block 34*b* which turns on the unit indicator 13-2 to brighten the indicator "CAPACITY". Operations blocks 34*a* and 34*b* are followed by a series of decision blocks 35, 36, 37, 38 and 39 which respectively compares the ratio value stored in register Z with increasing scale values $a_1$, $a_2$, $a_3$ and $a_4$ in the range between zero and unity graduated on the memory availability indicator 12-2 (FIG. 2). Decision block 35 determines whether the ratio is equal to zero, and if so, all the indicator segments L1 through L5 are turned off (block 40) and control returns to block 30 to repeat the process. If the value in Z-register is not zero, control proceeds to block 36 to compare it with scale value $a_1$. If $Z \leqq a_1$, indicator segment L1 is illuminated and the remainder is dimmed (block 41), and if $Z > a_1$, the ratio is compared with $a_2$ (block 37). If $Z \leqq a_2$, indicator segments L1 and L2 are illuminated and the remainder is dimmed (block 42) and if $Z > a_2$, it is compared with $a_3$ (block 38). If $Z \leqq a_3$, indicator segments L1 to L3 are illuminated and the remainder is dimmed (block 43), and if $a_3 < Z \leqq a_4$, indicator segments L1 to L4 are illuminated and the segment L5 is dimmed (blocks 39, 44) and if $Z > a_4$, all the indicator segments are illuminated (block 45).

Since the lesser of the two ratios X and Y is indicated, the user is given a valid warning against possible depletion of the storage area.

The foregoing description shows only a preferred embodiment of the present invention. Various modifications are apparent to those skilled in the art without departing from the scope of the present invention which is only limited by the appended claims.

What is claimed is:

1. A selective calling display radio pager adapted to receive a paging signal including a selective calling address and a message, comprising:

a detector means for detecting a calling address identifying the radio pager;

a memory for storing each of a plurality of said messages in response to the detection of said pager identifying calling address, said memory having a plurality of cells which are organized into a plurality of sectors for storing said messages and a plurality of directory cells respectively indicating entries of the messages stored in said sectors;

message display means for providing a display of each of said messages stored in said memory;

graphic alarm indicator means; and means associated with said memory for determining whether said sectors or directory cells are a more accurate early warning indication against possible depletion of said memory and for providing a display of a quantity on said graphic alarm indicator means, said quantity indicating a degree of availability of said memory in terms of said determined sectors or directory cells.

2. A selective calling display radio pager adapted to receive a paging signal including a selective calling address and a message, comprising:

detector means for detecting a calling address identifying the radio pager;

a memory for storing each of a plurality of said messages in response to the detection of said pager identifying calling address, said memory being divided into sectors and directory cells, each of said messages being stored in one or more of said sectors, said directory cells respectively indicating entries of the stored messages and having a maximum number smaller than the maiximum number of said sectors;

message display means for providing a display of each of said messages stored in said memory;

graphic alarm indicator means;

means for determining the ratio of a sum of the directory cells which are available for storage to said maximum number of said directory cells;

means for determining the ratio of a sum of the sectors which are available for storage to said maximum number of said sectors; and means for selecting one of said ratios which is smaller than the other and for providing a display of the selected ratio on said graphic alarm indicator means.

3. A selective calling display radio pager as claimed in claim 2, wherein said graphic alarm indicator means comprises a row of segments of increasing size and content indicators for identifying the ratio being displayed.

4. A method for operating a selective calling display radio pager adapted to receive a paging signal containing a calling address and a message, comprising the steps of:

(a) detecting a calling address identifying the radio pager;

(b) storing each of a plurality of said messages in response to the detection of said pager identifying calling address into a memory which is organized into a plurality of sectors for storing said messages and a plurality of directory cells respectively indicating entries of the messages stored in said sectors; and (c) determining whether said sectors or directory cells are a more accurate early warning indication against possible depletion of said memory; and (d) graphically displaying a quantity indicating a degree of availability of said memory in terms of said determined sectors or directory cells.

5. A method as claimed in claim 4, wherein the step (c) comprises:

determining the ratio of a sum of message segments which are stored in said sectors to a maximum number of message segments which can be stored into said sectors;

determining the ratio of a sum of message entries which are stored in said directory cells to a maximum number of message entries which can be stored into said directory; and determining one of said ratios which is smaller than the other as said determined sectors or directory cells.

* * * * *